United States Patent Office 3,451,234
Patented June 24, 1969

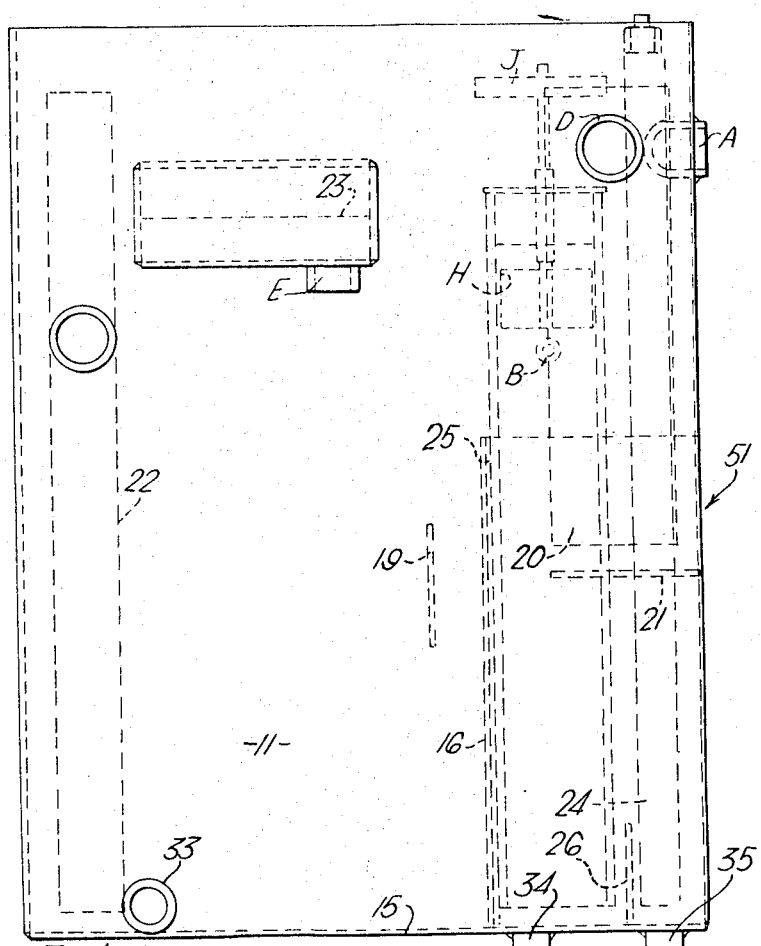
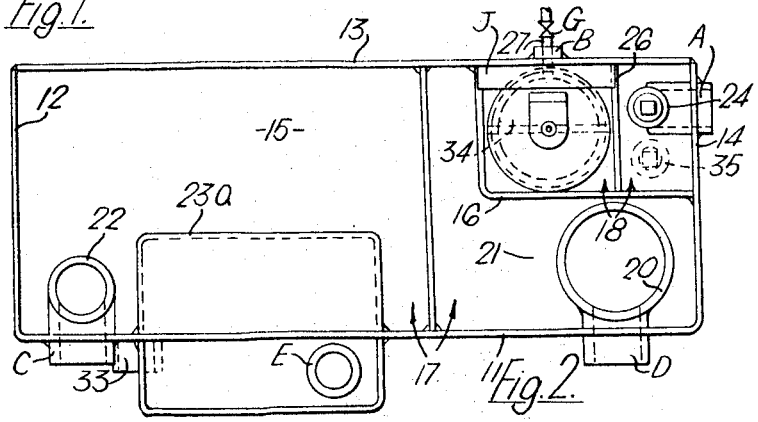
Fig. 1.
Fig. 2.

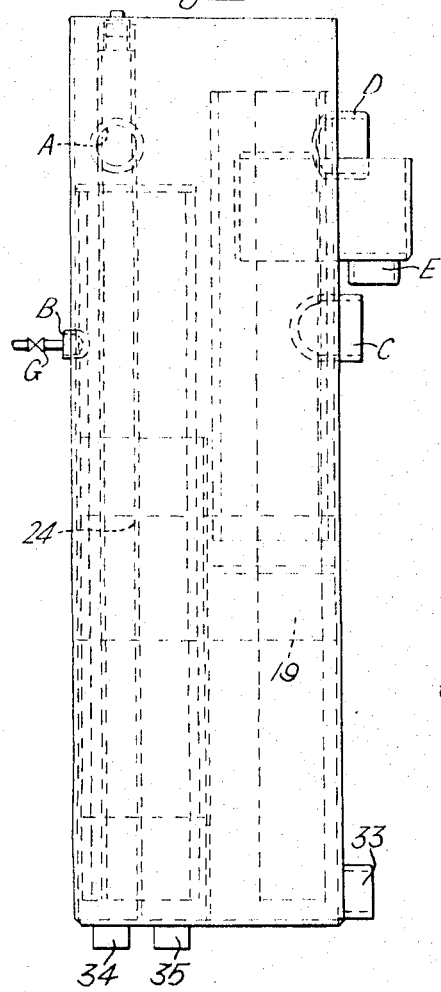
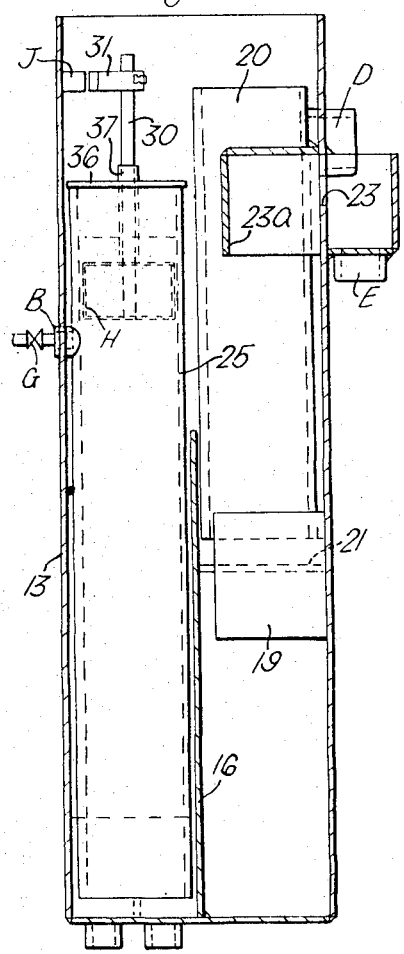

3,451,234
LIQUID SEPARATORS
James Palmer, Leatherhead, England, assignor to Neil & Spencer Limited, Leatherhead, England, a British company
Filed Aug. 9, 1967, Ser. No. 659,492
Claims priority, application Great Britain, Aug. 11, 1966, 36,082/66
Int. Cl. D06f 43/08
U.S. Cl. 68—18                4 Claims

ABSTRACT OF THE DISCLOSURE

A separator for recovering solvent from a dry cleaning machine. The separator includes a tank having an inlet for a mixture of solvent and water from the machine, a partition dividing the tank into two sections wherein liquid from one section can overflow the partition to the other section. On one side of the partition there is a restricted outlet for solvent and a float for detecting the solvent level and on the other side of the partition there is an unrestricted solvent outlet and a water outlet which determines the maximum water level.

---

Figure 5:
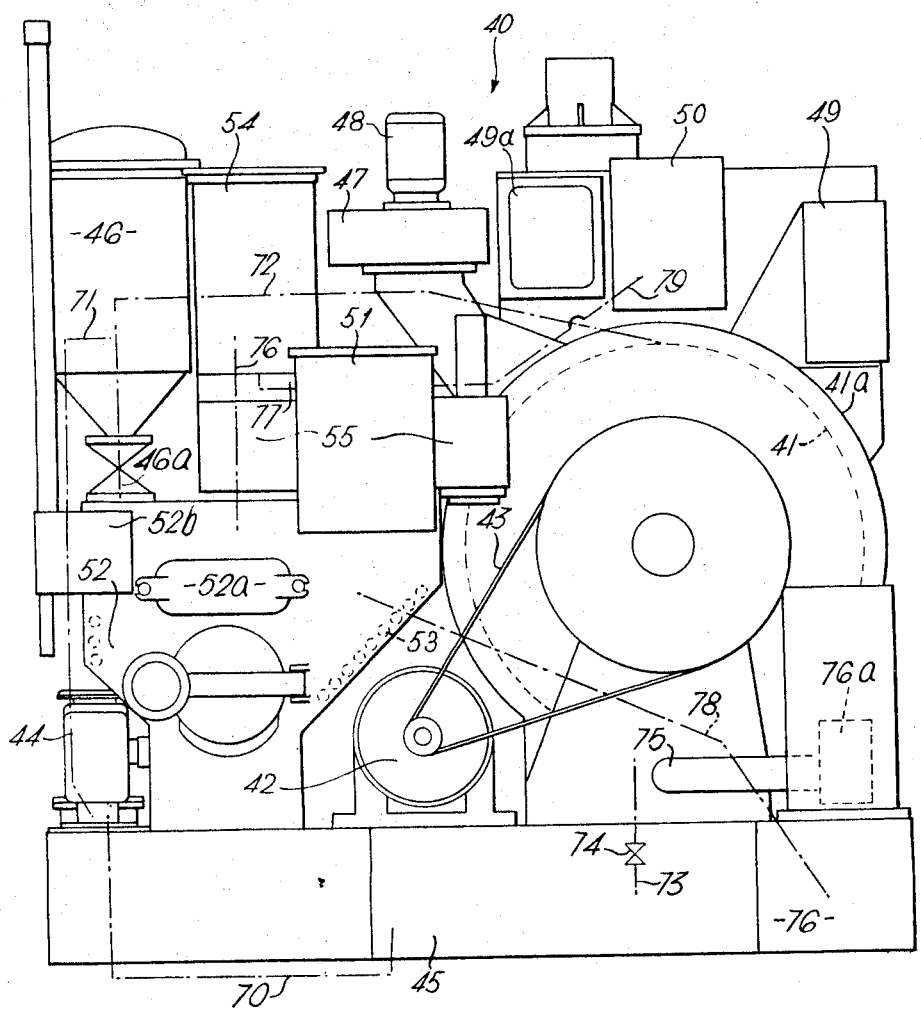

This invention relates to liquid separators for separating two liquids of different density.

According to this invention a liquid separator comprises a first chamber having a base and an inlet for a mixture of two liquids of different density, a second chamber which is positioned to receive overflow of liquid from the first chamber, an outlet from the first chamber for the more dense liquid separated in the first chamber, which outlet is nearer the base than the height at which liquid overflows into the second chamber, and means for detecting when the outflow of more dense liquid through the outlet exceeds the inflow of more dense liquid through the inlet.

One example of the invention as applied to a machine for dry cleaning clothes and other textile materials will now be described with reference to the accompanying drawings in which:

FIGURE 1 is an elevation of a separator according to the invention;
FIGURE 2 is a plan view of FIGURE 1;
FIGURE 3 is an elevation in the direction of arrow 3;
FIGURE 4 is a section on the line 4—4 of FIGURE 2; and
FIGURE 5 is a diagrammatic elevation of a dry cleaning machine having the separator of FIGURES 1 to 4.

The dry cleaning machine is shown at 40 (FIGURE 5) and has a conventional drum 41 rotatable by an electric motor 42 through a belt drive 43. The drum is in a casing 41a. A batch of clothes to be cleaned is put into the drum through a door (not shown). Solvent is then pumped by a pump 44 through pipes 70, 71, 72, 73 from a main solvent storage tank 45 through a filter 46 and a valve 46a, to the drum, which is being rotated, and back to the tank 45 again. By this means, dirt is removed from the clothes and taken into suspension in the solvent, and is then separated in the filter from the solvent and accumulated in the filter and the cleaned solvent goes to tank 45. An amount of clean solvent is then pumped into the drum with a valve 74 in pipe 73 closed. A soap and water emulsion is then added to the solvent in the drum, and the drum is rotated, to remove water-soluble stains from the clothes. The drum is then drained of solvent, together with the fluff which has accumulated at a button and fluff trap at the bottom of the drum, the liquid passing through pipe 75 into a tank 76. A further quantity of clean solvent is passed into the drum to rinse the clothes, the liquid passing from the drum to the tank 76.

Further solvent and water are removed from the clothes by rotating the drum at high speed, the liquid extracted passing to the tank 76. The clothes are then dried by passing air through the drum by means of a fan 47, driven by an electric motor 48, which passes the air over a steam heated coil 49 and through a dust collector 49a, the evaporated solvent and water being condensed by a condenser 50, from which liquid solvent and water can pass through pipe 79 to a liquid separator 51 and the separated solvent then passing to a further storage tank 55 which can be drained to the tank 45 or from which solvent may be passed to the drum for rinsing the clothes. The drying is stopped as described below.

The filter 46 collects sludge, which includes solvent and water. When it is desired to clean the filter and recover the solvent in the sludge, the sludge is allowed to drop into a still 52. The still has a pressure door 52a to which a pressure safety valve 52b is connected. The still is then heated by a steam coil indicated at 53 and evaporated solvent and water pass through pipe 76 to a still condenser 54 and condensed solvent and water pass through pipe 77 to the separator from whence the separated solvent passes to the tank 55. The liquid in tank 76 can be pumped to still 52 by pump 76a through pipe 78, and solvent recovered by heating as described above. The separator 51, FIGURE 5, is a hollow chamber having a lid (not shown) and having outer walls 11, 12, 13, 14, FIGURES 1 to 4, and a base 15 all made from sheet material. A sheet wall 16 constituting a weir extends between the walls 13, 14 and divides the chamber into a first chamber 17 and a second chamber 18.

The separator is used for recovery of solvent both during heating of the still, during distillation of the sludge residue and recovery from tank 76, and during the drying of the garments after they have been cleaned, and is located to communicate with the condensers 50 and 54, and the tank 55.

During distillation of the sludge residue (heating of the still), the solvent/water mixture enters the chamber 17 through an inlet D and flows into a vertical surge tube or pipe 20 the lower end of which is spaced from a horizontal plate baffle 21. The solvent and water separate in the chamber 17, and the solvent, which is heavier than the water, flows upwardly through a vertical pipe 22 to an unrestricted solvent outlet C leading to the tank 55. The lighter water flows through a horizontal slot 23 in the wall 11 to a water outlet E leading to a drain. A water outlet baffle 23a is disposed near slot 23, which provides an upper limit to the level of the less dense water in the chamber. A wall 19 prevents liquid surging directly from the bottom of pipe 20 into pipe 22.

During drying of the clothes, the solvent/water mixture enters the chamber 18 through an inlet A communicating with a vertical pipe 24. Solvent and water separate in the chamber 18. A vertical wall 26 divides the chamber 18 to prevent liquid surging straight from pipe 24 into solvent outlet pipe 25. The solvent is for example perchlorethylene which is more volatile than water. Thus when heating the still or drying the clothes, the liquid entering the separator will initially be almost wholly solvent so that during drying some of the solvent overflows the weir 16, and flows up pipe 22 leading to the tank 55, and some of the solvent flows up the pipe 25 to a restricted solvent outlet B, at the same level as outlet C, leading to the tank 55. Water separated in chamber 18 flows above the weir 16 and through the slot 23 to water outlet E. The lower ends of the pipes 24, 25 are slightly spaced from the base 15. The lower ends of pipes 22, 25 are below the normal balanced interface in chambers 17, 18.

An outlet pipe 27 from outlet B contains an adjustable valve G which is set in a position to allow a flow of solvent corresponding to the clothes being in the desired condition of dryness. Instead of a valve, an adjustable restriction may be used.

In its normal balanced condition the separator contains separated solvent and water. In chamber 17 there is an interface between the solvent and water. Pipe 22 contains only solvent which fills the pipe 22 up to the outlet C. The water level is at the level of the bottom of slot 23. The pressure of water above the interface equals the pressure of the solvent in pipe 22 above the level of the interface; this determines the height of E above C.

The chamber 18 also contains separated water and solvent, the interface being at the same level as in chamber 17, the pipe 25 containing solvent only. The height of the weir 16 and the solvent outlet B above the base 15 is more than the height of the normal, balanced, interface in chamber 17.

During the first part of the drying period there is a large inflow at A and the solvent level in chamber 18 will rise and some solvent will overflow the weir and pass to outlet C, as described above. The solvent level in pipe 25 will also rise and solvent flows out at B. A closed float chamber H floats on the solvent in the pipe 25 and is arranged to operate an electric reed switch J through a magnet 31 fixed to a rod 30 which is fixed to the chamber H and extends out through a cap 36 at the top of the pipe 25 and a guide tube 37 brazed to the cap. The reed switch and magnet have no mechanical contact so that the operation of the switch J is in good response to the relative flows through A and B. As drying progresses, the rate of inflow at A decreases and eventually the inflow at A is less than the outflow at B permitted by valve G. The solvent level (which is an interface if any water remains above the solvent) in the chamber 18 and the pipe 25, then falls and the chamber H moves downwards and when it reaches a certain position at switch J opens and this is arranged to stop the fan to stop the drying. At this time the supply of steam to the heater 49 is also stopped and the drum is stopped by suitable mechanism. The position of H at which this occurs corresponds to a flow through inlet A of just less than that corresponding to the clothes reaching the desired condition of dryness.

The termination of drying is not in any way dependent on the rate of flow of water through inlet A, because the pipe 25 extends below the level of solvent and contains only solvent. The water will find its own level above the weir 16.

The level of solvent in the chamber 18 is not affected by the solvent flow into chamber 17 during heating of the still because the weir 16 is above the solvent/water interface in chamber 17. The water separated in chamber 17 will find its own lvel above the weir 16.

This arrangement differs from known arrangements in which drying is continued for a predetermined period which is estimated to give a desired dryness to the clothes.

All surfaces in the separator are manufactured from or covered with a corrosion resistant material. For example they are made from steel covered with galvanizing although the pipes can be made from brass or other corrosion resistant material.

The separator can be drained through normally closed drain holes 33, 34, 35 in the base and wall 11.

The separator can be used, other than in a dry cleaning machine, where the level of solvent in the chamber 18 can be used to control the inflow of the more dense liquid into the separator.

Pipes 20, 24 are closed to atmosphere to prevent solvent fumes escaping. The top of pipe 22 has a small hole to prevent syphoning into the storage tank. The cap 36 over pipe 25 is not a tight fit, so that the chamber H is not affected by air pressure, and also to prevent syphoning.

It will be clear to the skilled man that the various parts of the apparatus are connected by the necessary pipes to enable the solvent etc. to flow as described, and the necessary valves to prevent communication between certain parts at the different stages of the cleaning process. Some of these pipes and valves have been omitted from FIGURE 5 for clarity.

There could be at least one other chamber similar to chamber 18 and for receiving inflow from a second dry cleaning machine and having a float similar to H, the liquid produced by heating the sludge residue entering at D.

When drying the clothes it is desirable to leave as much water as possible in the clothes whilst extracting as much solvent as possible. This improves the feel of the clothes when removed from the drum. Drying is not continued for so long that all the solvent is extracted from the clothes because this would result in too much water being removed from the clothes. Valve G is therefore made adjustable, so that if desired it can be adjusted for batches of differing weights although normally G will be set to some position which gives adequate drying for all loads normally handled by the machine.

I claim:
1. A liquid separator comprising a chamber having a base, an inlet above the base for a mixture of two liquids of different density, an outlet, above the normal balanced interface in the chamber, for the less dense liquid to provide an upper limit to the level of less dense liquid, a weir dividing the chamber into two parts and extending above said interface but below said outlet, a restricted outlet above the normal balanced interface for the more dense liquid separated in the chamber, a first duct extending from the restricted outlet to a location in one part of the chamber below said interface, an unrestricted outlet above the normal balanced interface for the more dense liquid which does not flow through the restricted outlet, a second duct extending from the unrestricted outlet to a location in the other part of the chamber below said interface, and means, responsive to the level of more dense liquid in the one part of the chamber, for detecting when the outflow of more dense liquid through the restricted outlet exceeds the inflow of more dense liquid through the inlet.

2. A separator as claimed in claim 1, in which the detecting means is a float which can float on the more dense liquid in the first duct.

3. A separator as claimed in claim 1, in which the detecting means controls mechanism operative to stop the flow through the inlet when the outflow of more dense liquid through the restricted outlet exceeds the inflow of more dense liquid through the inlet.

4. A dry cleaning machine comprising a rotatable drum for receiving clothes to be cleaned, means for rotating the drum, means operative to evaporate cleaning solvent and water from clothes in the drum, a condenser connected to condense the evaporated solvent and water, a liquid separator as claimed in claim 1 positioned so that said inlet receives a mixture of condensed solvent and water from the condenser, and a tank for receiving solvent outflow from said restricted outlet.

References Cited
UNITED STATES PATENTS 2,656,696 10/1953 McDonald _____ 68—18
3,246,493 4/1966 Oles _____ 68—18

ALAN COHAN, *Primary Examiner.*

U.S. Cl. X.R.

34—133; 137—172, 574